United States Patent
Jo et al.

(10) Patent No.: US 11,310,649 B2
(45) Date of Patent: Apr. 19, 2022

(54) METHOD FOR WIRELESS CONNECTION IN WIRELESS LAN SYSTEM AND WIRELESS DEVICE USING SAME

(71) Applicant: LG ELECTRONICS INC., Seoul (KR)

(72) Inventors: Youngjun Jo, Seoul (KR); Giwon Park, Seoul (KR); Hyunsik Yang, Seoul (KR); Jeonghwan Yoon, Seoul (KR); Taesung Lim, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 16/971,296

(22) PCT Filed: Feb. 20, 2019

(86) PCT No.: PCT/KR2019/002082
§ 371 (c)(1),
(2) Date: Aug. 19, 2020

(87) PCT Pub. No.: WO2019/164268
PCT Pub. Date: Aug. 29, 2019

(65) Prior Publication Data
US 2020/0396584 A1 Dec. 17, 2020

Related U.S. Application Data

(60) Provisional application No. 62/641,245, filed on Mar. 9, 2018, provisional application No. 62/633,069, filed on Feb. 20, 2018.

(30) Foreign Application Priority Data

Mar. 15, 2018 (KR) .......................... 10-2018-0030530

(51) Int. Cl.
*H04W 4/00* (2018.01)
*H04W 8/00* (2009.01)
(Continued)

(52) U.S. Cl.
CPC ............. *H04W 8/005* (2013.01); *H04W 4/23* (2018.02); *H04W 4/80* (2018.02); *H04W 84/12* (2013.01)

(58) Field of Classification Search
CPC . H04W 36/0055; H04W 36/03; H04W 12/08; H04W 4/80; H04W 88/06; H04W 4/20; H04W 84/18; H04L 63/205
(Continued)

(56) References Cited

U.S. PATENT DOCUMENTS 6,842,460 B1 * 1/2005 Olkkonen ............. H04W 48/16
370/328
7,734,717 B2 * 6/2010 Saarimaki ............. H04L 67/104
709/217
(Continued)

FOREIGN PATENT DOCUMENTS

| KR | 20160091977 | 8/2016 |
|---|---|---|
| KR | 20160101025 | 8/2016 |
| KR | 20170137617 | 12/2017 |

OTHER PUBLICATIONS

PCT International Application No. PCT/KR2019/002082, International Search Report dated May 28, 2019, 2 pages.
(Continued)

*Primary Examiner* — Marceau Milord
(74) *Attorney, Agent, or Firm* — Lee, Hong, Degerman, Kang & Waimey PC

(57) ABSTRACT

A method by which a first wireless device performs a wireless connection in a wireless LAN system, according to one embodiment, comprises the steps of: receiving an advertising packet from a second wireless device through a primary channel, wherein the advertising packet includes first information for specifying a Wi-Fi service for the advertising packet and second information linked to the existence of additional data, and the first information is set
(Continued)

as a first value linked to a DPP procedure or a second value linked to a NAN procedure; establishing a BLE-based connection with the second wireless device in order to receive the additional data; transmitting, to a second wireless terminal, a request packet for requesting additional data; and receiving, from the second wireless device, a response packet, including the additional data, as a response to the request packet, wherein the additional data is associated with DPP bootstrap URI information of the second wireless device.

10 Claims, 15 Drawing Sheets

(51) Int. Cl.
  *H04W 4/23* (2018.01)
  *H04W 4/80* (2018.01)
  *H04W 84/12* (2009.01)

(58) Field of Classification Search
  USPC .............................. 370/329, 328, 392, 435
  See application file for complete search history.

(56) References Cited

U.S. PATENT DOCUMENTS

| | | | | |
|---|---|---|---|---|
| 9,351,154 | B1* | 5/2016 | Steve | H04W 8/20 |
| 10,171,592 | B2* | 1/2019 | Qi | H04L 67/16 |
| 10,182,326 | B2* | 1/2019 | Lee | H04W 4/23 |
| 10,390,113 | B2* | 8/2019 | Kwon | H04W 8/005 |
| 10,827,334 | B2* | 11/2020 | Jung | H04W 76/23 |
| 2006/0259602 | A1* | 11/2006 | Stewart | H04L 67/16 709/223 |
| 2010/0054154 | A1* | 3/2010 | Lambert | H04L 41/0886 370/254 |
| 2011/0105024 | A1* | 5/2011 | Palin | H04W 8/005 455/41.2 |
| 2011/0165896 | A1* | 7/2011 | Stromberg | G06Q 20/321 455/466 |
| 2012/0079128 | A1* | 3/2012 | Stirbu | H04L 67/16 709/230 |
| 2012/0134490 | A1* | 5/2012 | Liu | H04L 9/0662 380/28 |
| 2014/0112245 | A1 | 4/2014 | Qi et al. | |
| 2014/0323048 | A1* | 10/2014 | Kang | H04W 76/14 455/41.2 |
| 2015/0133054 | A1* | 5/2015 | Chen | H04W 8/005 455/41.2 |
| 2015/0373525 | A1* | 12/2015 | Yang | H04W 4/00 370/338 |
| 2016/0134709 | A1* | 5/2016 | Savolainen | H04W 4/80 370/338 |
| 2018/0077124 | A1* | 3/2018 | Ramoutar | H04L 63/067 |
| 2018/0359627 | A1* | 12/2018 | Ko | H04L 67/303 |
| 2019/0124049 | A1* | 4/2019 | Bradley | H04W 76/14 |

OTHER PUBLICATIONS

Core System Package [Low Energy Controller volume], Bluetooth Specification Version 5.0 vol. 6, Dec. 8, 2016, 265 pages.

* cited by examiner

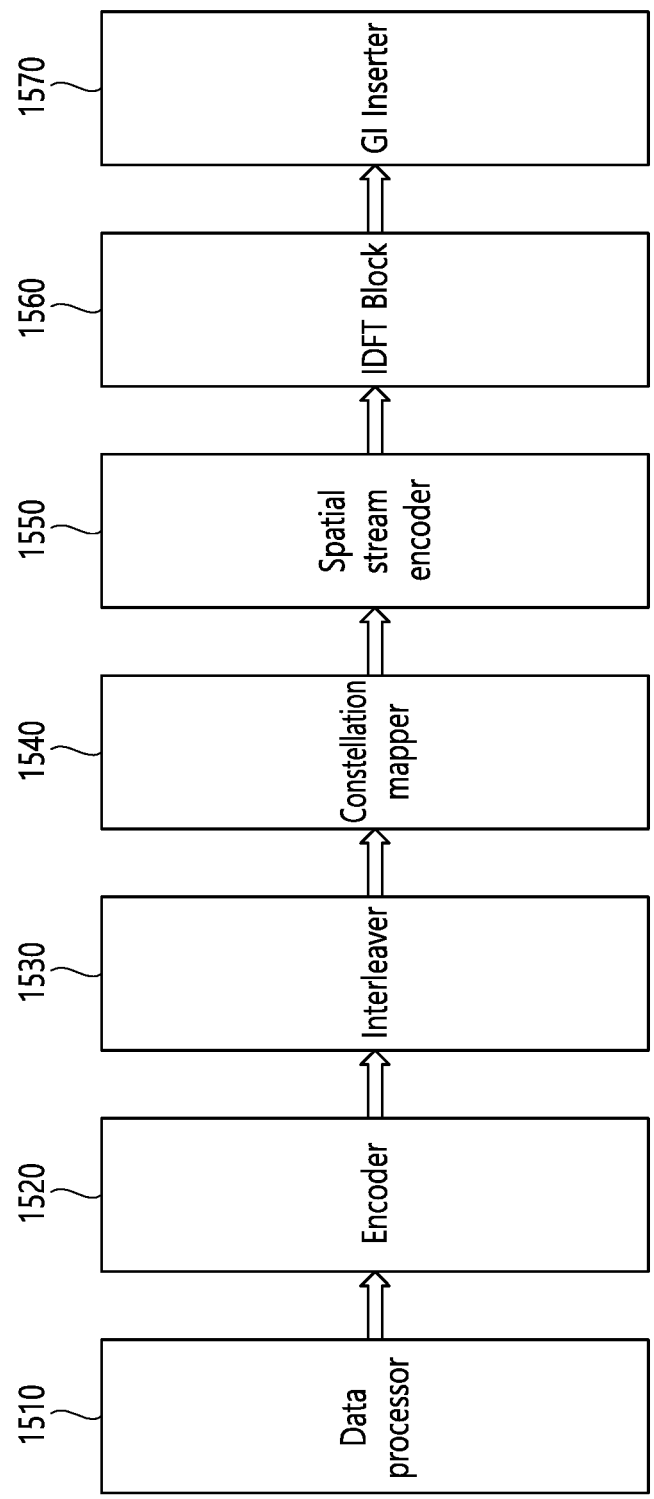

METHOD FOR WIRELESS CONNECTION IN WIRELESS LAN SYSTEM AND WIRELESS DEVICE USING SAME

CROSS-REFERENCE TO RELATED APPLICATIONS

This application is the National Stage filing under 35 U.S.C. 371 of International Application No. PCT/KR2019/002082, filed on Feb. 20, 2019, which claims the benefit of U.S. Provisional Application No. 62/633,069, filed on Feb. 20, 2018, and 62/641,245, filed on Mar. 9, 2018, and also claims the benefit of earlier filing date and right of priority to Korean Application No. 10-2018-0030530, filed on Mar. 15, 2018, the contents of which are all hereby incorporated by reference herein in their entirety.

BACKGROUND

Field of the Disclosure

This specification relates to wireless communication and, most particularly, to a method for establishing wireless connection in a wireless LAN system and a wireless device for using the same.

Related Art

The wireless display transmission technology is a technology enabling users to watch images (or video) being displayed in a mobile device through a large-sized television (TV) screen or monitor screen. The wireless display transmission technology may be broadly divided into a content transmission method and a mirroring method (i.e., screen casting).

The content transmission method is a method of converting a mobile device screen to a signal and transmitting the converted signal to a remote device. The mirroring method is a method of simultaneously showing (or displaying) an image (or video) of a mobile device on a remote device by streaming a content file to the remote device. The mirroring method is advantageous in that it can wirelessly transmit pixel information of an original screen, without modification, in real-time without being dependent on a specific service.

Miracast may be understood as a wireless image (or video) transmission standard created by the Wi-Fi Alliance, as well as a wireless display transmission technology. Furthermore, Miracast may also be understood as a type that follows the mirroring method.

SUMMARY

Technical Objects

An object of this specification is to provide a method for establishing wireless connection in a wireless LAN system having more enhanced performance and a wireless device for using the same.

Technical Solutions

A method for establishing a wireless connection, by a first wireless device, in a wireless LAN system according to an embodiment of the present disclosure may include the steps of receiving an advertising packet from a second wireless device through a primary channel, wherein the advertising packet may include first information specifying a Wi-Fi service for the advertising packet and second information related to a presence of additional data, and wherein the first information may be set to a first value related to a DPP procedure or a second value related to a NAN procedure, establishing a BLE-based connection with the second wireless device for receiving the additional data, transmitting a request packet requesting the additional data to the second wireless device, and receiving a response packet including the additional data from the second wireless device as a response to the request packet, wherein the additional data may be related to DPP Bootstrap URI information of the second wireless device.

Effects of the Disclosure

According to an embodiment this specification, provided herein is a method for establishing wireless connection in a wireless LAN system having more enhanced capabilities and a wireless device for using the same.

BRIEF DESCRIPTION OF THE DRAWINGS

FIG. 15 is a block diagram showing an example of a device being included in a processor.

DESCRIPTION OF EXEMPLARY EMBODIMENTS

The aforementioned features and following detailed descriptions are provided for exemplary purposes in order to facilitate the description and understanding of the present specification. That is, the present specification is not limited to such an embodiment and thus may be embodied in other forms. The following embodiments are examples given merely for fully disclosing the present specification and are intended to convey description of the present specification to those having ordinary skills in the art to which the present specification pertain. Therefore, in cases where there are multiple methods of implementing the configuration elements of the present specification, it shall be necessary to clarify that the implementation of the present specification can be carried out by using any one of the aforementioned methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to facilitate the understanding of the disclosure also includes complementary embodiments thereof.

The terms used in the present specification have the meaning as commonly understood by those ordinarily skilled in the art to which the present specification pertains. Commonly used terms shall be interpreted as having a meaning that is consistent with their meaning in the context of the present specification. Further, the terms used in the present specification shall not be interpreted in an excessively idealized or formal meaning (or sense) unless otherwise defined. Hereinafter, an embodiment of the present specification will be described with reference to the accompanying drawings.

Figure 1:
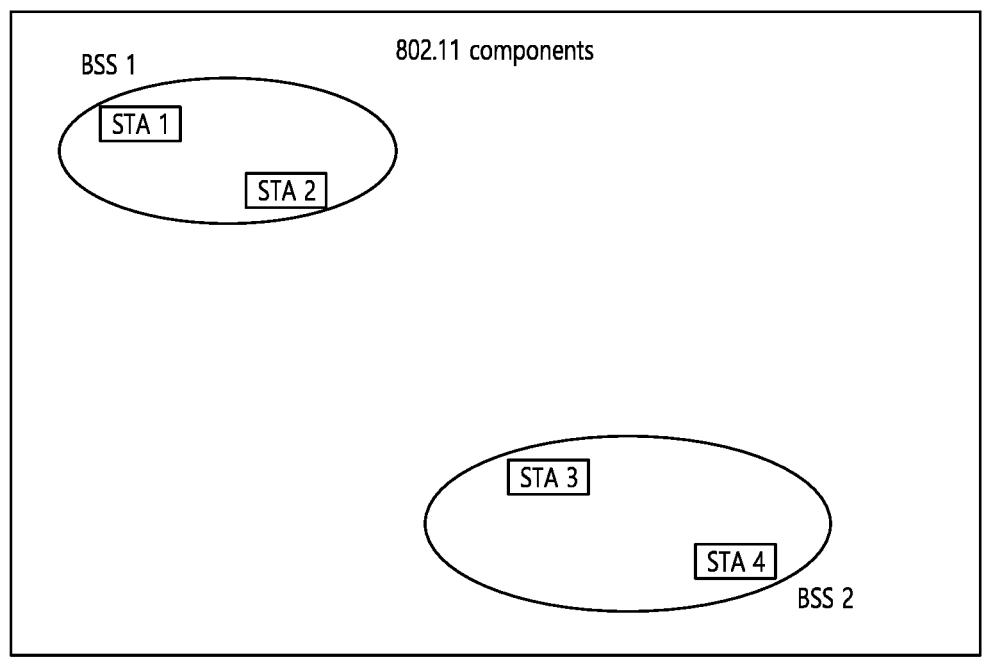
FIG. 1 is an exemplary diagram showing an IEEE 802.11 system structure.

FIG. 1 is an exemplary diagram showing an IEEE 802.11 system structure.

Referring to FIG. 1, an IEEE 802.11 structure may be configured of multiple configuration elements, and a wireless local area network (hereinafter referred to as 'WLAN'), which supports transparent STA mobility for a higher layer by an interaction between the configuration elements, may be provided.

A Basic Service Set (BSS) may be a basic configuration block of an IEEE 802.11 LAN. Referring to FIG. 1, two BSSs (BSS1 and BSS2) may exist, and each BSS may include two STAs. For example, STA1 and STA2 may be included in BSS1, and STA3 and STA4 may be included in BSS2.

Herein, an STA refers to a device operating in accordance with a Medium Access Control (MAC)/Physical (PHY) regulation of IEEE 802.11. A station (STA) may include an Access Point (AP) STA (briefly referred to as 'AP') and a non-AP STA. The AP corresponds to a device providing a network (e.g., WLAN) connection to a non-AP STA through a radio interface. The station may be referred to by various terms, such as a (wireless LAN (WLAN)) device.

An AP may be configured as a fixed type or a mobile type and may include a mobile wireless device (e.g., laptop computer, smartphone, and soon) providing a hot-spot. In another wireless communication field, the AP may correspond to a Base Station (BS), a Node-B, an Evolved Node-B (eNB), a Base Transceiver System (BTS), a Femto BS, and so on.

A non-AP STA generally corresponds to a device that is directly handled by a user, such as a laptop computer, a PDA, a wireless modem, a smartphone, and so on. A non-AP STA may also be referred to as a terminal, a Wireless Transmit/Receive Unit (WTRU), a User Equipment (UE), a Mobile Station (MS), a Mobile Terminal, a Mobile Subscriber Station (MSS), and so on.

Referring to FIG. 1, an oval shape representing a BSS may be understood as a shape indicating a coverage area in which the STAs included in each BSS maintain communication. This area may be referred to as a Basic Service Area (BSA). In an IEEE 802.11 LAN, the most basic type of BSS is an Independent BSS (IBSS).

For example, an IBSS may have a minimum structure of being configured of only two STAs. Additionally, the BSS (BSS1 or BSS2) of FIG. 1 is the simplest structure, and this may be understood as a representative example of an IBSS. This configuration is possible in a case where STAs are capable of performing direct communication. Additionally, a LAN having the aforementioned structure may be configured when a LAN is needed instead of being planned in advance and configured accordingly. This type of LAN may also be referred to as an ad-hoc network.

In the conventional wireless LAN system, operations between devices (i.e., AP and STA) within an infrastructure basic service set (BSS), wherein the access point (AP) functions as a hub, are mainly defined.

The AP may perform a function of supporting a physical layer for a wireless/wired connection, a routing function for devices within the network, a function of adding/removing devices to/from the network, a function of providing services, and so on. More specifically, in the conventional wireless LAN system, devices within the network are connected through the AP and not connected to one another by direct connection.

As a technology for supporting direct connection between devices, a Wi-Fi Direct (hereinafter referred to as 'WFD') standard is being defined. Wi-Fi Direct (WFD) is a direct communication technology allowing devices (or stations (STAs)) to be easily connected to one another without an access point, which is essentially required in the conventional wireless LAN system. In case Wi-Fi Direct is being used, connection between the devices is configured without any complicated configuration (or set-up) processes. Thus, various services may be provided to the user.

Wi-Fi Direct (WFD) is also referred to as 'Wi-Fi P2P'. The Wi-Fi P2P further includes a part for supporting device-to-device direct communication, while maintaining most of the functions of the conventional Wi-Fi standard. Therefore, the Wi-Fi P2P is advantageous in that device-to-device P2P communication can be provided by sufficiently applying hardware and physical characteristics to a device being equipped with a Wi-Fi chip and by mainly performing software function update.

A device performing the role of an AP in the conventional infrastructure network exists in a P2P group, and, in the P2P standard, this device is referred to as a P2P Group Owner (hereinafter, referred to as 'P2P GO'). Various P2P Clients may exist around the P2P GO. Only one P2P GO may exist in one P2P Group, and the remaining devices are all Client devices.

In the Wi-Fi Alliance (hereinafter referred to as 'WFA'), a Wi-Fi Direct Service (hereinafter referred to as 'WFDS'), which supports various services using a Wi-Fi Direct link (e.g., Send, Play, Display, Print, and so on), is being researched. According to the WFDS, an application may be controlled or managed by an Application Service Platform (hereinafter referred to as 'ASP').

A WFDS device supported by the WFDS may include devices supporting a wireless LAN system, such as display devices, printers, digital cameras, projectors, smartphones, and so on. Also, the WFDS device may include an STA and an AP. And, WFDS devices existing within a WFDS network may be directly connected to one another.

The WFD standard is defined for performing transmission of audio/video (AV) data between devices while satisfying high quality and low latency. The Wi-Fi devices may be connected to one another by using a peer-to-peer (hereinafter referred to as 'P2P') method through a WFD network (WFD session) applying the WFD standard without passing through a home network, an office network, or a hotspot network.

Hereinafter, a device that transmits and receives data in accordance with the WFD standard may be expressed by using the term WFD device. The WFD devices within the WFD network may discover information on the WFD devices (e.g., capability information) corresponding to one another. And, then, after configuring (or setting up) a WFD session, the WFD devices may perform rendering on the contents through the WFD session.

A WFD session may be a network between a source device, which provides contents, and a sink device, which receives and performs rendering of the contents. The source device may also be expressed by using the term WFD source. In this specification, the sink device may also be expressed by using the term WFD sink.

The WFD source may perform mirroring of data existing in the display (or screen) of the WFD source to the display of the WFD sink. The WFD source and the WFD sink may exchange a first sequence message and may then perform device discovery and service discovery procedures.

After completing the device discovery and service discovery procedures between the WFD source and the WFD sink, an internet protocol (hereinafter referred to as 'IP') address may be allocated to each of the WFD source and the WFD sink. After establishing a transmission control protocol (hereinafter referred to as 'TCP') connection between the WFD source and the WFD sink, a real-time streaming protocol (hereinafter referred to as 'RTSP') stack and a real-time protocol (hereinafter referred to as 'RTP') stack for the WFD source and the WFD sink may be activated.

A capability negotiation procedure between the WFD source and the WFD sink may be performed through the RTSP. And, while the capability negotiation procedure is being performed, the WFD source and the WFD sink may exchange RTSP-based messages (e.g., M1 to M4). Thereafter, the WFD source and the WFD sink may exchange WFD session control messages.

Also, a data session may be established between the WFD source and the WFD sink through the RTP. In the WFD network, a User Datagram Protocol (hereinafter referred to as 'UDP') may be used for data transport.

Figure 2:
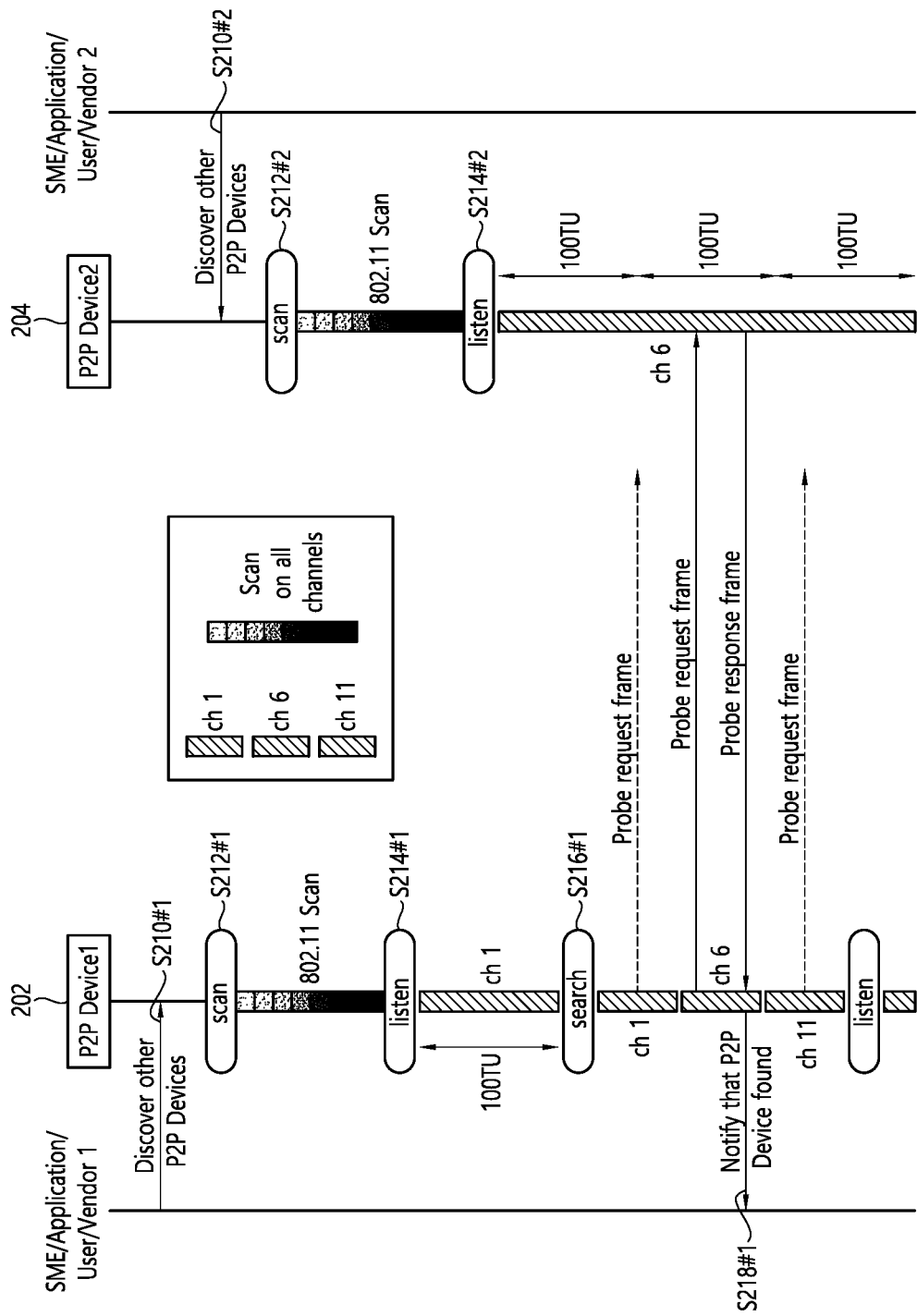
FIG. 2 is a diagram for describing a WFD device discovery process.

FIG. 2 is a diagram for describing a WFD device discovery process. Referring to FIG. 2, in step S210, the WFD device discovery process may be initiated by a Station Management Entity (SME)/Application/User/Vendor.

The WFD device discovery process may include a scan phase (S212) and a find phase (S214-S216).

For example, in the scan phase (S212 #1), a first P2P device (202) may search a neighboring P2P device for all available radio channels in accordance with an 802.11 method. In the scan phase (S212 #1), the first P2P device (202) may confirm a best operating channel.

As another example, in the scan phase (S212 #2), a second P2P device (204) may search a neighboring P2P device for all available radio channels in accordance with an 802.11 method. In the scan phase (S212 #2), the second P2P device (204) may confirm a best operating channel.

The find phase (S214-S216) may include a listen state (S214) and a search state (S216). The P2P device may alternately perform transition to/from the listen state (S214) and the search state (S216).

A P2P device being in the listen state (S214) may be on stand-by in order to receive a probe request frame. For example, a P2P device being in the listen state (S214) may maintain a receive state within one specific channel, among 3 social channels (i.e., ch #1, ch #6, ch #11).

For example, the first P2P device (202) being in the listen state (S214 #1) may be on stand-by in Channel number 1 (ch1). As another example, the second P2P device (204) being in the listen state (S214 #2) may be on stand-by in Channel number 6 (ch6).

A P2P device being in the search state (S216) may perform active scanning by using a probe request frame.

For example, for a fast search, a search range in which the active scanning is to be performed may be limited to social channels, such as Channel number 1, Channel number 6, and Channel number 11 (e.g., 2412 MHz, 2437 MHz, and 2462 MHz).

For example, if a probe request frame is received from the first P2P device (e.g., 202) being in a first search state (S216 #1), the second P2P device (e.g., 204) may respond with a probe response frame.

A time (e.g., 100, 200, 300 Time Unit (TU)) for the listen state (S214) may be randomly determined. The P2P devices may reach a common channel through an iteration (or repetition) of the search state and the receive state.

If another P2P device is found, the P2P device may exchange a probe request frame and a probe response frame with the other P2P device. Accordingly, the P2P devices may find/exchange one another's device type, manufacturer, or friendly device name.

If necessary information related to a neighboring P2P device, which is found by performing the WFD device discovery process, is obtained, the P2P device (e.g., 202) may notify that a P2P device is found to the SME/Application/User/Vendor (S218 #1).

Currently, P2P is mainly used for semi-static communication, such as remote printing, photo sharing, and so on. However, due to the generalization of Wi-Fi devices, location-based services, and so on, the scope of P2P application is becoming wider.

Figure 3:
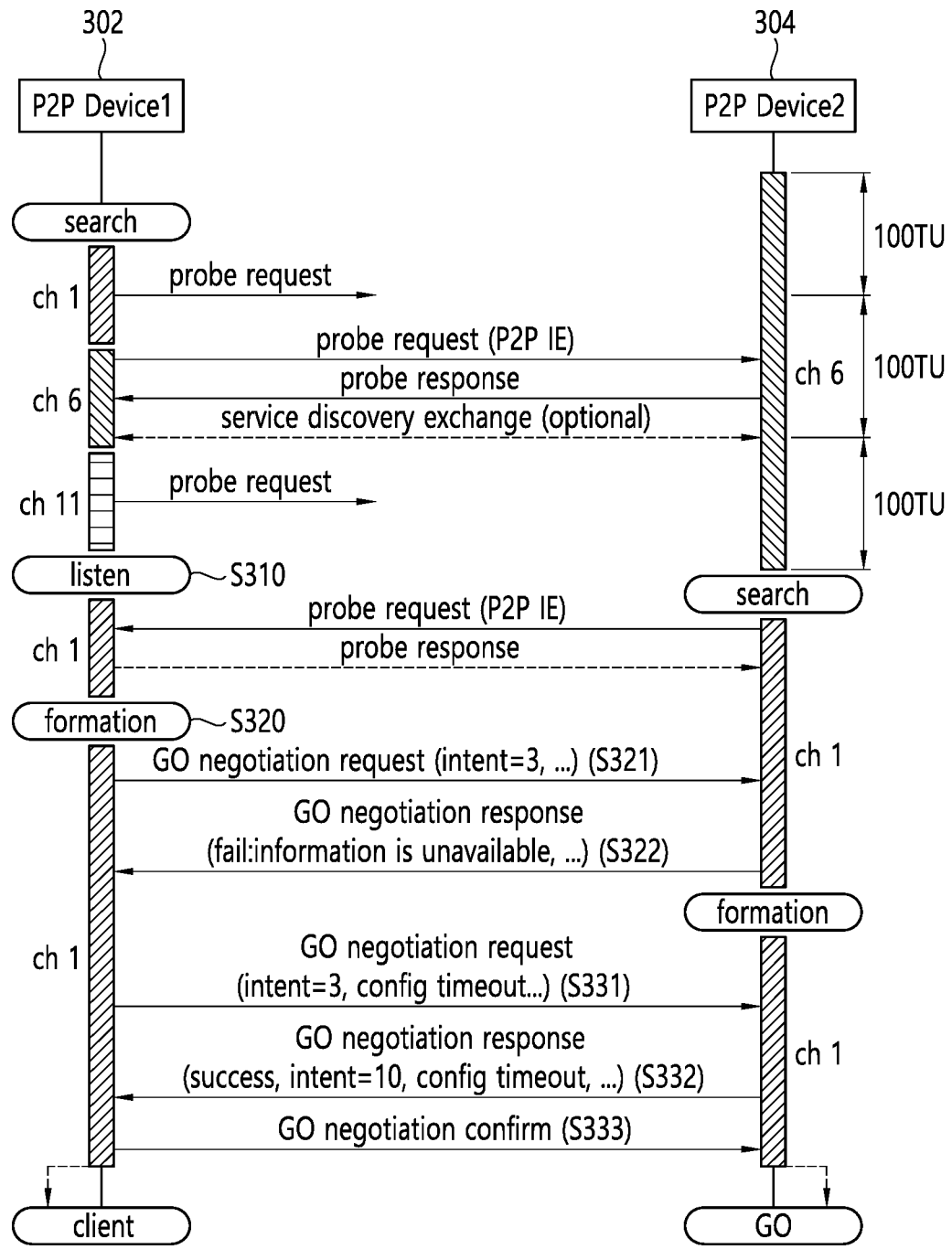
FIG. 3 is a diagram for describing a P2P GP Negotiation process.

FIG. 3 is a diagram for describing a P2P GP Negotiation process.

Referring to FIG. 3, a first P2P device (302) of FIG. 3 corresponds to the first P2P device (202) of FIG. 2, and a second P2P device (304) of FIG. 3 corresponds to the second P2P device (204) of FIG. 2.

In step S310, if a probe request frame is received from a second P2P device (304), which is found by performing the WFD device discovery process, a first P2P device (302) may respond with a probe response frame. In this case, the first P2P device (302) and the second P2P device (304) may operate on a same channel (i.e., ch1).

Accordingly, if the probe response frame is received, the second P2P device (304) may find (or discover) the first P2P device (302).

In step S320, in order to start a P2P group formation process, the first P2P device (302) may transition to a formation state for a P2P group.

In step S321, the first P2P device (302) may transmit a GO negotiation request frame to the second P2P device (304).

For example, a first intent value that is pre-configured to the first P2P device (302) for a group owner (hereinafter referred to as 'GO') may be equal to '3'. For example, the GO negotiation request frame may include information corresponding to the first intent value ('3') of the first P2P device (302).

The second P2P device (304) may attempt to transition to a formation state in accordance with the GO negotiation request frame, which is received in step S321.

In step S322, the second P2P device (304) may transmit a GO negotiation response frame to the first P2P device (302). For example, in step S322, the state of the second P2P device (304) is the formation state and not the search state. Accordingly, the GO negotiation response frame that is transmitted in step S322 may include information indicating failure ('fail').

In step S330, the second P2P device (304) may transition to a formation state in order to start the P2P group formation process.

In step S331, the first P2P device (302) may transmit a GO negotiation request frame to the second P2P device (304). For example, the GO negotiation request frame may include information corresponding to the first intent value ('3') of the first P2P device (302).

In step S332, the second P2P device (304) may transmit a GO negotiation response frame to the first P2P device (302). For example, a second intent value that is pre-configured to the second P2P device (304) for a GO may be equal to '10'.

In this case, since the second P2P device (304) has completed its transition to the formation state, the GO negotiation response frame being transmitted in step S332 may include information corresponding to the second intent value ('10') of the second P2P device (304).

In step S333, the first P2P device (302) may transmit a GO negotiation confirm frame to the second P2P device (304) in order to confirm the GO negotiation process.

For example, after transmitting the GO negotiation confirm frame, the first P2P device (302) may operate as a Client. And, after transmitting the GP negotiation confirm frame, the second P2P device (304) may operate as the group owner (GO).

Figure 4:
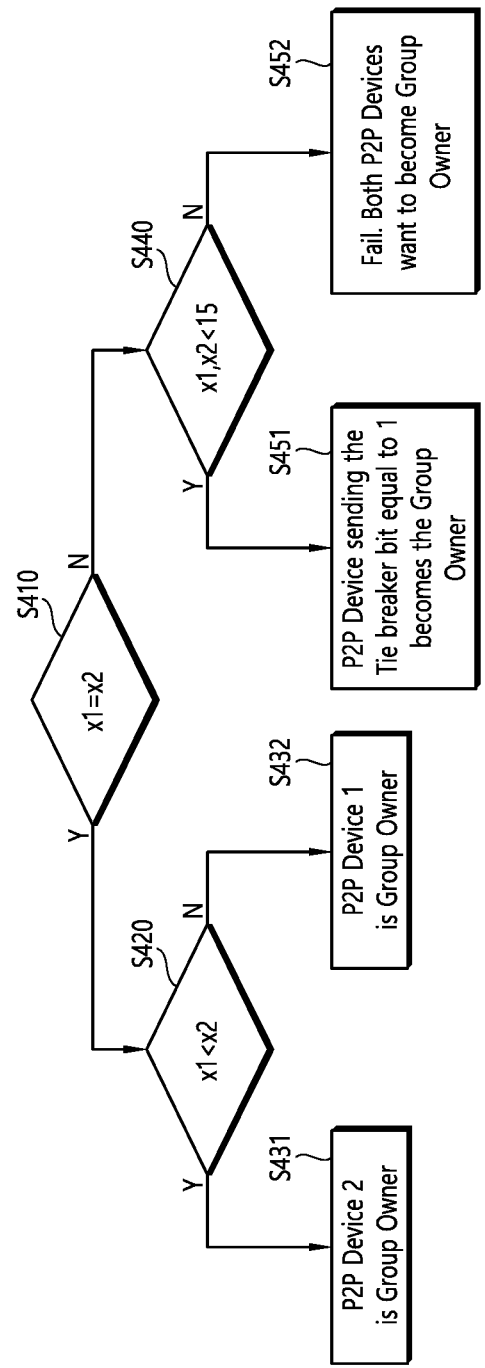
FIG. 4 shows a flow chart for determining a Group Owner based on an intent value.

FIG. 4 shows a flow chart for determining a Group Owner (GO) based on an intent value.

Referring to FIG. 3 and FIG. 4, 'x1' of FIG. 4 may be the first intent value of the first P2P device (302). And, 'x2' of FIG. 4 may be the second intent value of the second P2P device (304).

Each P2P device (302, 304) may perform a comparison operation based on its intent value and the intent value of its counterpart device through the above-described step S331 and step S332 of FIG. 3. Hereinafter, the P2P device may be understood as the aforementioned first P2P device (302) or second P2P device (304) of FIG. 3.

In step S410, the P2P device may compare whether or not 'x1' are 'x2' the same value.

If it is determined that 'x1' and 'x2' are not the same value, the process step proceeds to step S420. In step S420, the P2P device may determine whether or not the value of 'x1' is smaller than the value of 'x2'.

For example, if it is determined that the value of 'x1' is smaller than the value of 'x2', in step S431, the second P2P device (304) having the value of 'x2' may be determined as the group owner (GO). As another example, if it is determined that the value of 'x1' is greater than the value of 'x2', in step S432, the first P2P device (302) having the value of 'x1' may be determined as the group owner (GO).

If it is determined that 'x1' and 'x2' are the same value, the process step proceeds to step S440. In step S440, the P2P device may determine whether or not the values of 'x1' and 'x2' are smaller than '15'.

For example, if it is determined that the values of 'x1' and 'x2' are smaller than '15', between the two P2P devices, the P2P device having a specific bit set to '1' may become the group owner (GO). As another example, if it is determined that the values of 'x1' and 'x2' are greater than '15', a group owner (GO) cannot be determined from the two P2P devices.

Figure 5:
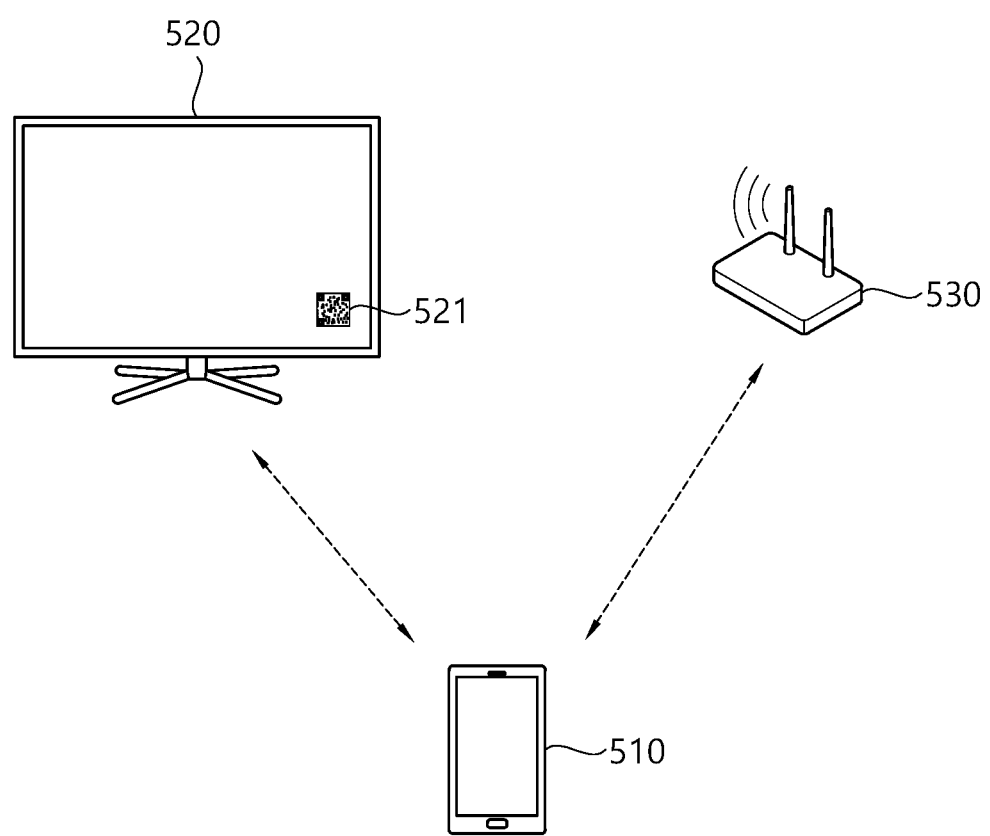
FIG. 5 is a conceptual diagram of a DPP procedure.

FIG. 5 is a conceptual diagram of a Device Provisioning Protocol (DPP) procedure.

Referring to FIG. 5, a DPP architecture for a DPP procedure may define the device roles for a DPP Bootstrapping protocol, a DPP Authentication protocol, a DPP Configuration protocol, and a DPP Introduction protocol.

In the DPP procedure, there may exist two types of roles for a wireless device. For example, there may exist the roles of a Configurator and an Enrollee. As another example, there may exist the roles of an Initiator and a Responder.

For clarity and simplicity in the description of FIG. 5, the configurator may be understood as a first wireless device (510). And, the enrollee may be understood as a second wireless device (520).

For example, the first wireless device (510), which is the configurator, may support setup of the second wireless device (520), which is the enrollee. The configurator and the enrollee may engage in the DPP Bootstrapping protocol, the DPP Authentication protocol, and the DPP Configuration protocol.

The configurator or enrollee may perform the role of an Initiator in the DPP Bootstrapping protocol and the DPP Authentication protocol. However, only the enrollee may initiate the DPP Configuration protocol and the DPP Introduction protocol.

As part of a Bootstrapping mechanism, the DPP Authentication protocol may request an initiator to acquire (or obtain) a bootstrapping key of a responder. Optionally, in order to provide authentication between one another, each wireless device may acquire the other's bootstrapping key.

If the DPP Authentication protocol is completed, the configurator may provision the enrollee for a device-to-device communication or an infrastructure communication.

As part of such provision, the configurator may enable the enrollee to establish secure associations with another peer (or other peers) within the network. Herein, another peer may be understood as a wireless device (530) that is already configured by the configurator.

The configurator and the enrollee may be engaged in the DPP Authentication protocol. According to the Bootstrapping scenario, the configurator or enrollee may each perform the roles of an initiator or responder.

A wireless device starting the DPP Authentication protocol may perform the role of an initiator. A wireless device responding to a request of the initiator may perform the role of a responder. The DPP Authentication protocol may provide an authentication of the responder to the initiator. Optionally, the DPP Authentication protocol may provide an authentication of the initiator to the responder.

For example, in order to perform unidirectional authentication, the initiator may obtain a bootstrapping key of the responder. Additionally, in order to optionally perform inter-authentication, the initiator and the responder may obtain one another's bootstrapping key.

For example, in order to configure an unprovisioned wireless device (520) performing the role of an enrollee, the wireless device (510) may perform the role of a configurator.

For example, the unprovisioned wireless device may be an access point or another wireless device.

When the wireless device (510) performing the role of the configurator starts the DPP Authentication protocol with the unprovisioned wireless device (520), the wireless device (510) may perform the role of the initiator.

Figure 6:
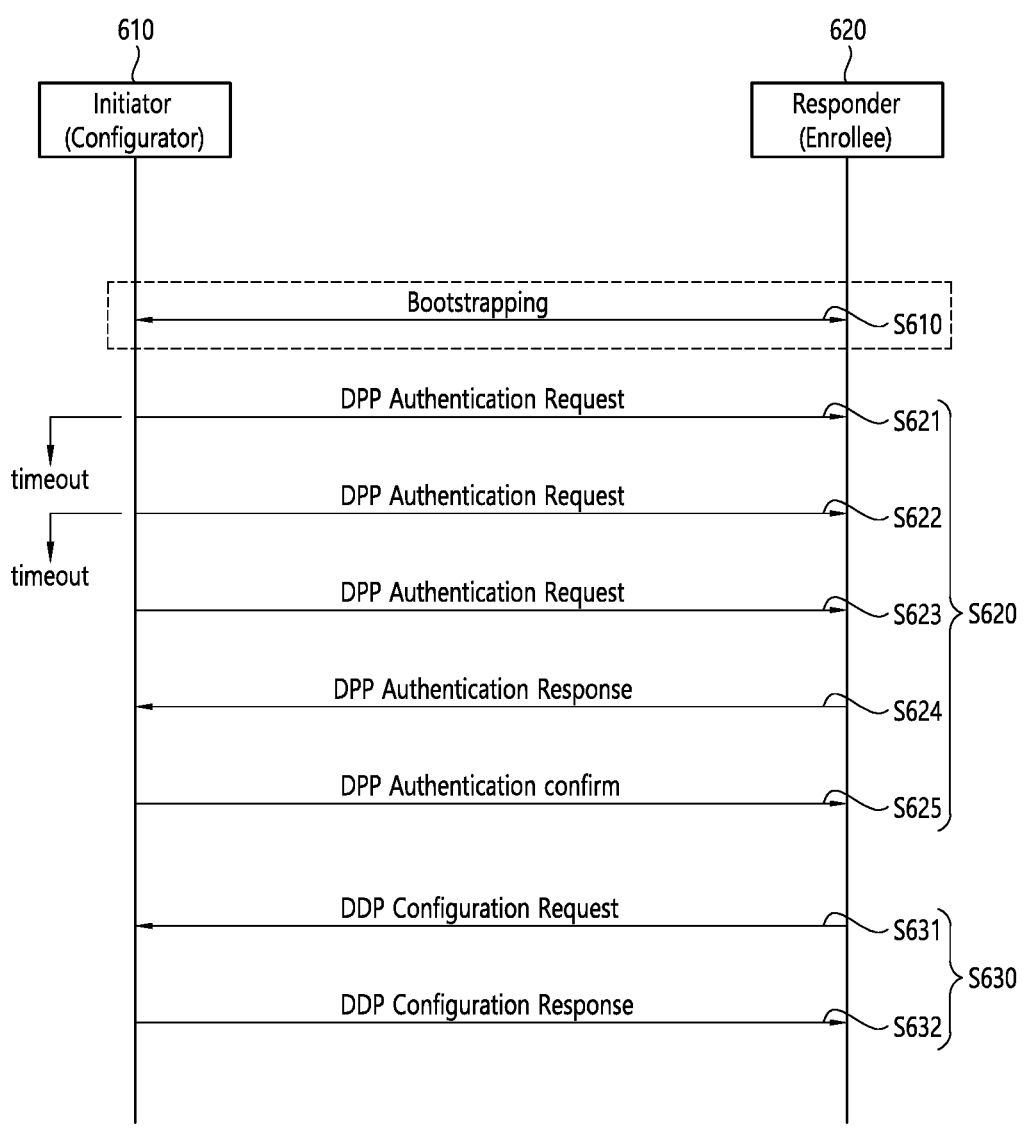
FIG. 6 is a flow chart showing a process of performing the DPP procedure between wireless devices.

FIG. 6 is a flow chart showing a process of performing the DPP procedure between wireless devices. The DPP procedure of FIG. 6 may be implemented as a 3-way handshaking method.

Referring to FIG. 5 and FIG. 6, a first wireless device (610) may perform the role of an initiator, and a second wireless device (620) may perform the role of a responder.

Additionally, the first wireless device (610) may perform the role of a configurator, and the second wireless device (620) may perform the role of an enrollee.

In step S610, the first wireless device (610) and the second wireless device (620) may perform the DPP Bootstrapping protocol.

For example, the first wireless device (610) performing the role of the configurator may acquire Bootstrapping information from the second wireless device (620) performing the role of the enrollee by using an Out Of Band (OOB) mechanism.

For example, the OOB mechanism may be implemented based on a scan QR code method, which is based on a QR code (e.g., 521), an NFC tap method, or a Bluetooth Low Energy (BLE) exchange method.

For example, the bootstrapping information may include information related to the enrollee's bootstrapping public key for the DPP Authentication protocol. For example, the bootstrapping public key may only be used for the DPP Authentication protocol being carried out by the configurator and the enrollee.

For example, information on a global operating class channel and information on a channel list may be further included in the bootstrapping information.

In this case, in order to start the DPP Authentication protocol, the wireless device (e.g., 620) may indicate that it is listening from one of the listed channels for another device (e.g., 610).

As another example, information on a global operating class channel or information on a channel list may not be included in the bootstrapping information.

In this case, the wireless device (e.g., 620) may not provide guidance on which channel the wireless device (e.g., 620) is listening to the other device (e.g., 610). Accordingly, the other device (e.g., 610) shall iterate all available channels.

Due to the iteration over multiple channels, a considerable extra delay may occur in the DPP Authentication protocol. Accordingly, a device using QR Code bootstrapping may be requested to include a single channel or at most a short list of possible channels in the bootstrapping information.

The first wireless device (610) of FIG. 6 may start an operation on a channel that is specified based on the bootstrapping information, which is acquired from the second wireless device (620). The second wireless device (620) of FIG. 6 may listen to a specific channel during step S610.

Hereinafter, in this specification, step S610 will be described under a given assumption that it is implemented based on the Bluetooth Low Energy (hereinafter referred to as 'BLE') method. Additionally, in this specification, when step S620 and step S630 are started, it may be mentioned that the DPP Protocol is started.

In step S620, the first wireless device (610) and the second wireless device (620) may perform the DPP Authentication protocol.

For example, the first wireless device (610) performing the role of a configurator may transmit a DPP Authentication request frame to the second wireless device (620) performing the role of an enrollee. In this case, the DPP Authentication request frame may be transmitted through at least one channel corresponding to the bootstrapping information (e.g., channel list).

In step S621, the first wireless device (610) may transmit a DPP Authentication request frame to the second wireless device (620). Subsequently, the first wireless device (610) may wait for a response to the DPP Authentication request frame, which is transmitted in step S621.

For example, the first wireless device (610) may determine whether or not a DPP Authentication response frame, which is a response to the DPP Authentication request frame transmitted in step S621, is being received from the second wireless device (620) within a pre-determined period of time.

For example, the predetermined period of time may be configured based on a transmission point of the DPP Authentication request frame in step S621.

For clarity and simplicity in the description of FIG. 6, it may be assumed that, as a response to the DPP Authentication request frame being transmitted in step S621, a DPP Authentication response frame is not received until the predetermined period of time has elapsed.

According to the aforementioned assumption, in case the DPP Authentication response frame is not received until the predetermined period of time has elapsed, step S622 is performed in order to re-transmit the DPP Authentication response frame.

In step S622, the first wireless device (610) may re-transmit the DPP Authentication request frame to the second wireless device (620). Subsequently, the first wireless device (610) may wait for a response to the DPP Authentication request frame, which is transmitted in step S622.

For example, the first wireless device (610) may determine whether or not a DPP Authentication response frame, which is a response to the DPP Authentication request frame re-transmitted in step S622, is being received from the second wireless device (620) within a pre-determined period of time.

For example, the predetermined period of time may be configured based on a transmission point of the DPP Authentication request frame in step S622.

For clarity and simplicity in the description of FIG. 6, it may be assumed that, as a response to the DPP Authentication request frame being re-transmitted in step S622, a DPP Authentication response frame is not received until the predetermined period of time has elapsed.

According to the aforementioned assumption, in case the DPP Authentication response frame is not received until the predetermined period of time has elapsed, step S623 is performed in order to re-transmit the DPP Authentication response frame.

In step S623, the first wireless device (610) may re-transmit the DPP Authentication request frame to the second wireless device (620). Subsequently, the first wireless device (610) may determine whether or not a DPP Authentication response frame, which is a response to the DPP Authentication request frame re-transmitted in step S623, is being received from the second wireless device (620) within a pre-determined period of time.

For example, the predetermined period of time may be configured based on a transmission point of the DPP Authentication request frame in step S623.

For clarity and simplicity in the description of FIG. 6, it may be assumed that a DPP Authentication response frame is received within a predetermined period of time. According to the aforementioned assumption, in case the DPP Authentication response frame is received before the predetermined period of time is elapsed, step S624 is performed.

In step S624, the first wireless device (610) may receive a DPP Authentication response frame from the second wireless device (620) as a response to the DPP Authentication request frame, which is re-transmitted in step S623.

In step S631, in order to start the DPP Configuration protocol, the second wireless device (620) may transmit a DPP Configuration request frame to the first wireless device (610). Herein, regardless of whether or not the initiator or responder performs the role of a configurator, the DPP Configuration request frame may only be transmitted by the enrollee.

In step S632, the first wireless device (610) may transmit a DPP Configuration response frame to the second wireless device (620) as a response to the DPP Configuration request frame. The DPP Configuration response frame may include a DPP Configuration object. For example, the DPP Configuration object may include multiple parameter information, as shown below in Table 1.

TABLE 1

| Parameter | Name | Type | Value | Description |
|---|---|---|---|---|
| DPP Configuration object | configurationObject | OBJECT | | |
| Wi-Fi Technology object: | wi-fi_tech | STRING | infra | Future revisions may include the values dpp_config, nan, p2p, asp2. |
| Service | SVC | STRING | | Optional parameter depending on the value of wifi_tech |
| Discovery object: | discovery | OBJECT | | |
| SSID | ssid | STRING | alpha numeric | The name of the network to connect to |
| Credential object | cred | OBJECT | | |
| Authentication and key management type | akm | STRING | psk, dpp, sae, psk + sae | The authentication type for the network |
| Pre-shared key | psk_hex | STRING | Pre-shared key encoded in hex. | Conditionally present for akm = psk |
| WPA2 Passphrase and/or SAE password | pass | STRING | PSK or SAE Passphrase/password. | Conditionally present for akm = psk, sae, psk + sae. |
| DPP Connector | signedConnector | STRING | | DPP Connector as a JWS, see section 4.2. Present for akm = dpp |
| C-sign-key | csign | JWK | | Configurator public key (configurator); "key_ops" and "use" objects in a "csign" object shall not be present. Present for akm = dpp. Note that JSON Web Keys use an uncompressed format. |

In step S625, the first wireless device (610) may transmit a DPP Authentication confirm frame to the second wireless device (620) in order to complete the DPP Authentication protocol.

If the DPP Authentication protocol (S620) is successfully performed in accordance with the transmission of the DPP Authentication confirm frame, a secure channel may be established between the initiator (or configurator) and the responder (or enrollee).

In step S630, the first wireless device (610) and the second wireless device (620) may perform the DPP Configuration protocol.

In step S630, the first wireless device (610) and the second wireless device (620) may use a same MAC address. Additionally, in step S630, the first wireless device (610) and the second wireless device (620) may use the same channel that was used during the DPP Authentication protocol.

If the above-described step S610 to step S630 are successfully performed, network information of a wireless LAN system including an AP (not shown), which is associated in advance with the first wireless device (610), may be delivered to the second wireless device (620). For example, the network information may include S SID information or password information.

That is, without performing a separate association procedure with an AP (not shown), which is associated with the first wireless device (610), the second wireless device (620) may be connected to the wireless LAN system based on the network information, which is received from the first wireless device (610).

Figure 7:
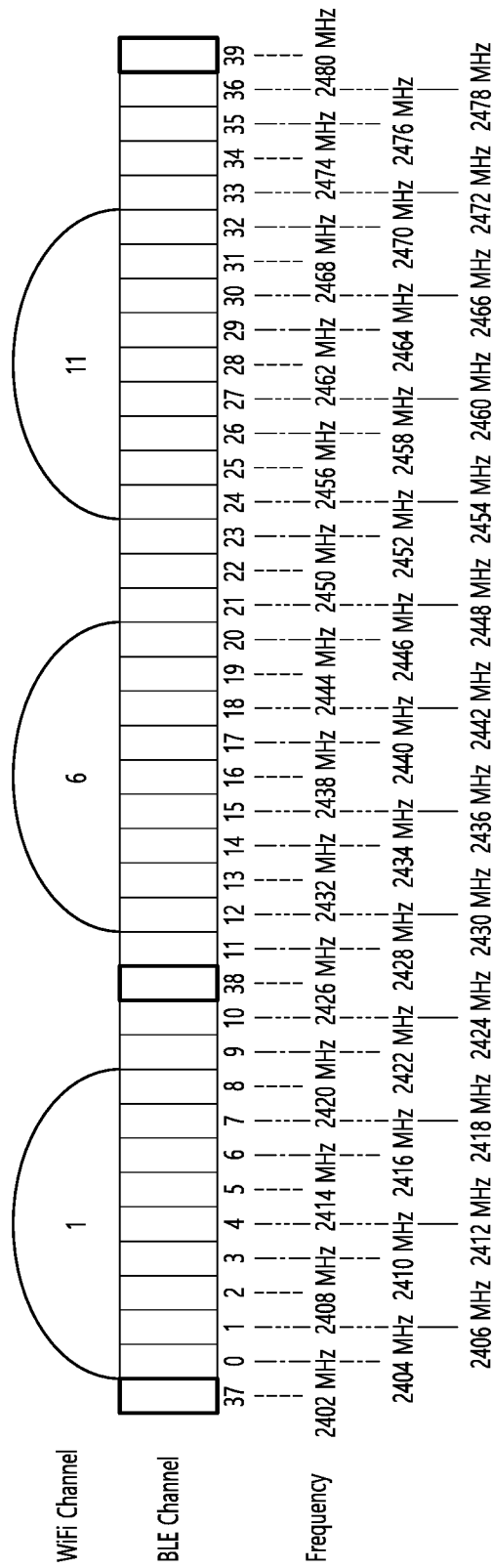
FIG. 7 is a diagram showing channelization for BLE-based communication.

FIG. 7 is a diagram showing channelization for BLE-based communication.

Referring to FIG. 7, 40 channels each having a 2 MHz bandwidth of a 2.4 GHz band for a Bluetooth low energy (BLE)-based communication are illustrated.

For example, $37^{th}$ to $39^{th}$ BLE channels (BLE ch #37~39) may be used for an Advertising Channel.

In this specification, $37^{th}$ to $39^{th}$ BLE channels (BLE ch #37~39) may be mentioned as primary channels. Herein, the Advertising Channel may be allocated for the communication of packets being exchanged in order to establish connection with advertising packets.

For example, the remaining BLE channels (BLE ch #0~36) may be understood as data channels. In this specification, the remaining BLE channels (BLE ch #0~36) may be mentioned as secondary channels.

More specifically, the remaining BLE channels (BLE ch #0~36) may be used for the exchange of data packets after establishing connection.

In the BLE-based communication according to this specification, only two types of packets (i.e., Advertising Packet, Data Packet) exist.

For example, only Advertising type packets may be transmitted and/or received before establishing the BLE-based connection between the wireless devices. Additionally, after establishing the BLE-based connection between the wireless devices, Data type packets may be transmitted and/or received.

For example, the BLE-based Advertising packets may be defined in accordance with a specific reference standard, as shown below in Table 2.

TABLE 2

| Advertising Event Type | PDU Type | PDU Length |
|---|---|---|
| Connectable and Scannable Undirected | ADV_IND | 8~39 bytes |
| Connectable Directed | ADV_DIRECT_IND | 14 bytes |
| Non-Connectable and Non-Scannable Undirected | ADV_NONCONN_IND | 8~39 bytes |
| Scannable | ADV_SCAN_IND | 8~39 bytes |

According to this specification, a first reference standard for defining an Advertising packet may be Connectability.

For example, when a Connectable Advertising packet is received from a counterpart wireless device, it may be understood by the wireless device that the counterpart wireless device wishes to establish a connection with the wireless device.

Accordingly, the wireless device may transmit a Connection Request (hereinafter referred to as CONNECT REQ) to the counterpart wireless device. In this case, when a different type of packet other than the CONNECT REQ is received by the counterpart wireless device, the counterpart wireless device may ignore (or disregard) the corresponding packet and may perform hopping to a next channel.

As another example, when a Non-Connectable Advertising packet is received from a counterpart wireless device, the wireless device cannot transmit a CONNECT REQ.

According to this specification, a second reference standard for defining an Advertising packet may be Scannability.

For example, when a Scannable Advertising packet is received from a counterpart wireless device, the wireless device may transmit a Scan Request (hereinafter referred to as SCAN REQ) to the counterpart wireless device. In this case, when a different type of packet other than the SCAN REQ is received by the counterpart wireless device, the counterpart wireless device may ignore (or disregard) the corresponding packet.

According to this specification, a third reference standard for defining an Advertising packet may be Directability.

For example, MAC address information of a wireless device of a transmitting end and MAC address information of a counterpart wireless device of a receiving end may be included in a Directed packet. Additionally, data that is wanted by the user may not be included in the Directed packet.

As another example, MAC address information of the counterpart wireless device of a receiving end may not be included in an Undirected packet. Additionally, data that is wanted by the user may be included in the Undirected packet.

Referring to Table 2, when a type of the BLE-based Advertising packet is an ADV_IND, a PDU of the ADV_IND type may be understood as a packet having a Connectable and Scannable characteristic. In this case, the PDU of the ADV_IND type may have a length of 8~39 bytes.

When a type of the BLE-based Advertising packet is an ADV_DIRECT_IND, a PDU of the ADV_DIRECT_IND type may be understood as a packet having a Connectable Directed characteristic. In this case, the PDU of the ADV_DIRECT_IND type may have a length of 14 bytes.

When a type of the BLE-based Advertising packet is an ADV_NONCONN_IND, a PDU of the ADV_NONCONN_IND type may be understood as a packet having a Non-Connectable and Non-Scannable Undirected characteristic. In this case, the PDU of the ADV_NONCONN_IND type may have a length of 8~39 bytes.

When a type of the BLE-based Advertising packet is an ADV_SCAN_IND, a PDU of the ADV_SCAN_IND type may be understood as a packet having a Scannable characteristic. In this case, the PDU of the Scannable type may have a length of 8~39 bytes.

Figure 8:
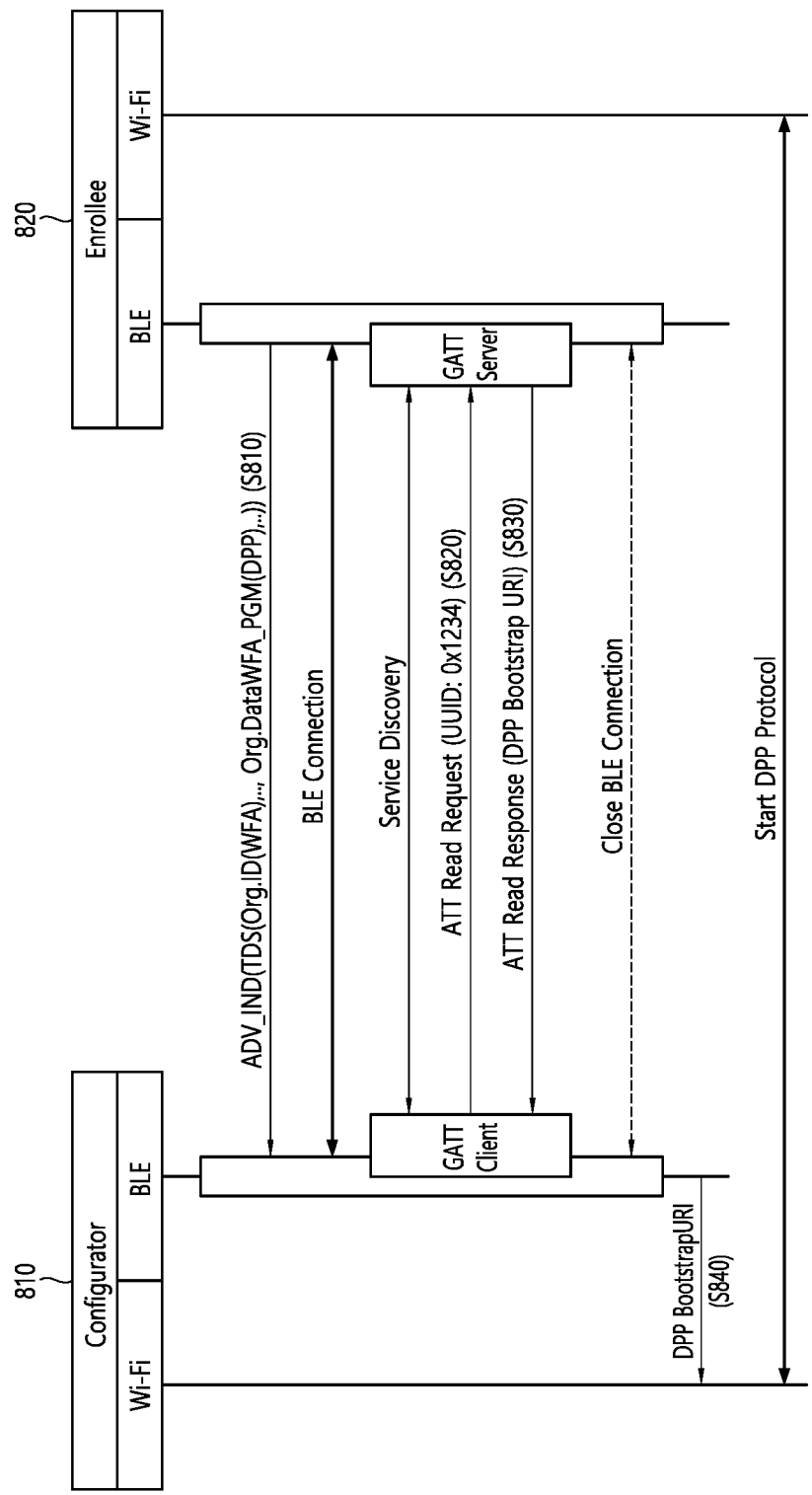
FIG. 8 is diagram showing a detailed view of a BLE-based Bootstrapping process for a DPP procedure according to an embodiment of the present disclosure.

FIG. 8 is diagram showing a detailed view of a BLE-based Bootstrapping process for a DPP procedure according to an embodiment of the present disclosure.

Referring to FIG. 1 to FIG. 8, a first wireless device (810) may include a BLE module and a Wi-Fi module. A second wireless device (820) may include a BLE module and a Wi-Fi module.

Referring to FIG. 8, the first wireless device (810) may perform the role of a Configurator for a DPP procedure. The second wireless device (820) may perform the role of an Enrollee for the DPP procedure.

In step S810, before establishing a BLE-connection with the second wireless device (820), the first wireless device (810) may receive an ADV_IND type Advertising packet (hereinafter referred to as an ADV_IND packet) from the second wireless device (820).

Herein, the ADV_IND packet may be understood as a packet being transmitted through a primary channel (e.g., BLE ch #37~39 of FIG. 7).

Additionally, the ADV_IND packet may follow a format of a Transport Discovery Service (TDS) packet, which is universally used for WFA. Herein, information for specifying a Wi-Fi service, which is supported by a wireless device transmitting a TDS packet, may be included in a TDS packet.

For example, a Wi-Fi service in which the TDS packet is to be used may be a Device Provisioning Protocol (DPP), a Neighbor Awareness Network (NAN), or an Application Service Provider (ASP).

According to an embodiment of the present disclosure, information for specifying a Wi-Fi service in which the TDS packet is to be used may be included in a WFA program field (hereinafter referred to as a PGM field).

For example, information indicating the WFA may be included in an Org.ID field of the ADV_IND packet. Additionally, information indicating the DPP may be included in a PGM field, which is included in an Org.Data field of the ADV_IND packet.

Furthermore, the ADV_IND packet may have limited room for carrying additional information. Accordingly, a Transfer Data Incomplete field of the ADV_IND packet may be set to have a value (e.g., 1) for notifying that additional information is scheduled to be delivered after establishing a BLE connection.

If an ADV_IND packet having a specific value configured in the Transfer Data Incomplete field is received, the first wireless device (810) may attempt to establish a BLE connection with the second wireless device (820) in order to receive additional information.

After establishing the BLE connection, the first wireless device (810) may perform the role of a Generic Attribute (GATT) Profile Client sending a data request to a GATT server.

The second wireless device (820) may perform the role of a GATT server. For example, the GATT server may manage information for Attribute Protocol (ATT) lookup data, information for service, and information for characteristic.

After establishing the BLE connection, the first wireless device (810) and the second wireless device (820) may perform a Service Discovery procedure for exchanging information on service/characteristic between one another.

The TDS packet format, which is mentioned in step S810, will be described in more detail later on with reference to FIG. 10.

In step S820, the first wireless device (810) may transmit an ATT Read Request packet, which requests DPP Bootstrap Uniform Resource Identifier (URI) information, to the second wireless device (820).

For example, the ATT Read Request packet may be implemented based on a universally unique identifier (hereinafter referred to as 'UUID'). For example, the UUID of the DPP Bootstrap URI information may be '0x1234'.

In step S830, the first wireless device (810) may receive an ATT Read Response message from the second wireless device (820) as a response to the ATT Read Request message.

For example, the ATT Read Response message may include DPP Bootstrap URI information of the second wireless device (820) corresponding to the UUID (e.g., 0x1234), which is included in the ATT Read Request message.

For example, the BLE connection between the first wireless device (810) and the second wireless device (820) may be released.

In step S840, the DPP Bootstrap URI information of the second wireless device (820), which is acquired through the BLE module of the first wireless device (810), may be delivered to the Wi-Fi module of the first wireless device (810).

Subsequently, a DPP protocol for an Authentication protocol (e.g., S620 of FIG. 6) of the DPP procedure and a Configuration protocol (e.g., S630 of FIG. 6) of the DPP procedure may be started.

Figure 9:
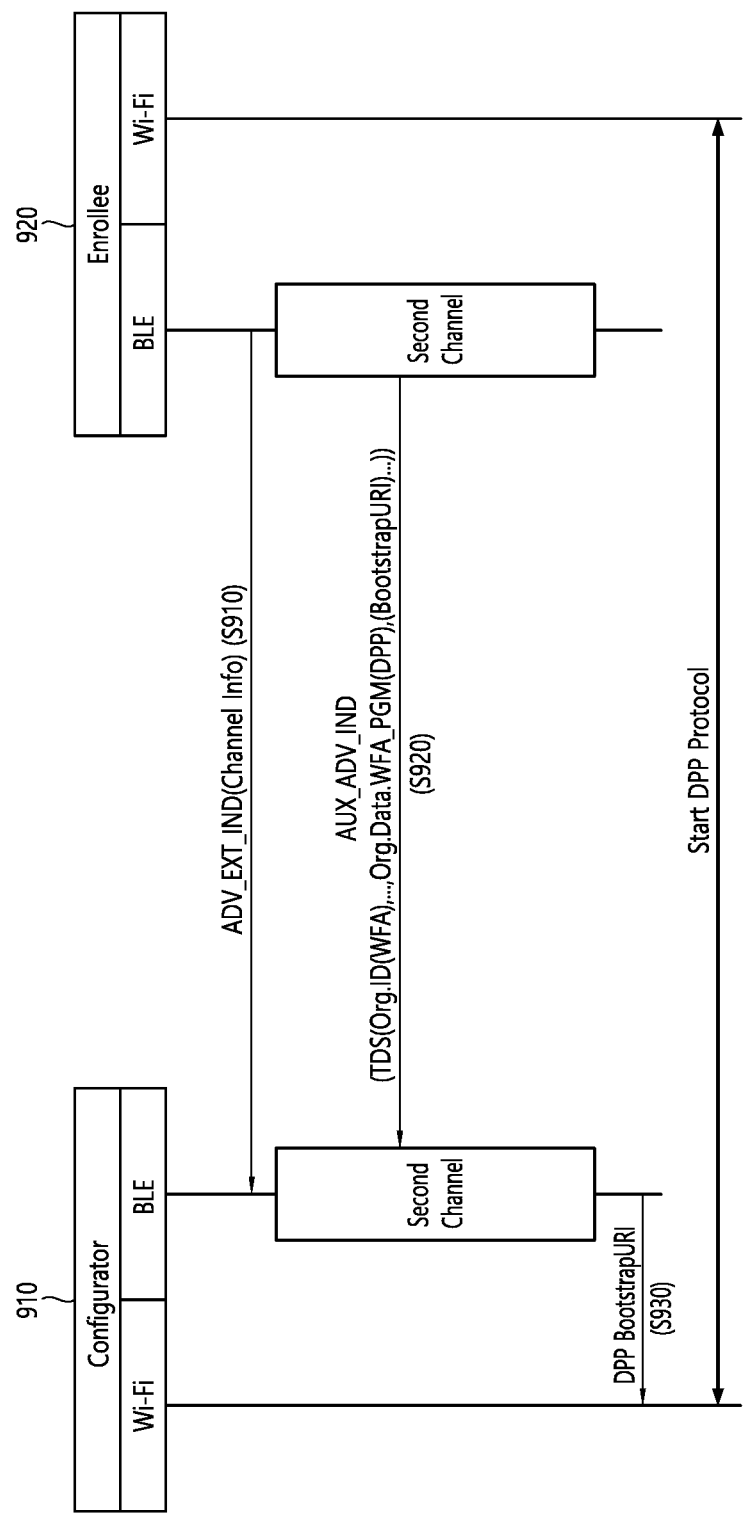
FIG. 9 is diagram showing a detailed view of a BLE-based Bootstrapping process for a DPP procedure according to another embodiment of the present disclosure.

FIG. 9 is diagram showing a detailed view of a BLE-based Bootstrapping process for a DPP procedure according to another embodiment of the present disclosure.

Referring to FIG. 8 and FIG. 9, a first wireless device (910) may include a BLE module and a Wi-Fi module. A second wireless device (920) may include a BLE module and a Wi-Fi module.

Referring to FIG. 9, the first wireless device (910) may perform the role of a Configurator for a DPP procedure. The second wireless device (920) may perform the role of an Enrollee for the DPP procedure.

In step S910, the first wireless device (910) may receive an ADV_EXT_IND type Advertising packet (hereinafter referred to as an ADV_EXT_IND packet) from the second wireless device (920).

For example, the ADV_EXT_IND packet may be understood as a packet being transmitted through a primary channel (e.g., BLE ch #37~39 of FIG. 7).

Herein, the ADV_EXT_IND packet may include channel information for a secondary channel (e.g., BLE ch #0~36 of FIG. 7).

For example, the second wireless device (920) may transmit an ADV_EXT_IND packet including information on the secondary channel (e.g., BLE ch #0~36 of FIG. 7). Subsequently, the second wireless device (920) may perform a channel hopping operation to a secondary channel.

In other words, the first wireless device (910) may perform a channel hopping operation to a secondary channel (i.e., any one channel among BLE ch #0~36 of FIG. 7), which is acquired based on the received ADV_EXT_IND packet.

In step S920, even without a BLE connection with the second wireless device (920) (BLE connectionless), the first wireless device (910) may receive an AUX_ADV_IND type Advertising packet (hereinafter referred to as an AUX_ADV_IND packet) from the second wireless device (920).

Herein, the AUX_ADV_IND packet may be understood as a packet being received through the secondary channel (i.e., any one channel among BLE ch #0~36 of FIG. 7).

Additionally, the AUX_ADV_IND packet may follow a format of a Transport Discovery Service (TDS) packet, which is universally used for WFA.

For example, a Wi-Fi service that can be supported by the wireless device may be a Device Provisioning Protocol (DPP), a Neighbor Awareness Network (NAN), or an Application Service Provider (ASP).

According to another embodiment of the present disclosure, a WFA program field (hereinafter referred to as a PGM field) indicating a Wi-Fi service, which can be supported by a wireless device for an AUX_ADV_IND packet following a format of a TDS packet, may be additionally defined.

For example, information indicating the WFA may be included in an Org.ID field of the AUX_ADV_IND packet. Additionally, information indicating the DPP may be included in a PGM field, which is included in an Org.Data field of the AUX_ADV_IND packet.

Furthermore, the AUX_ADV_IND packet may have sufficient room for carrying additional information. For example, up to 1645 bytes may be allocated for the Org.Data field of the AUX_ADV_IND packet.

Herein, DPP Bootstrap URI information of the second wireless device (920) may be included in the Org.Data field of the AUX_ADV_IND packet.

In step S930, the DPP Bootstrap URI information of the second wireless device (920), which is acquired through the BLE module of the first wireless device (910), may be delivered to the Wi-Fi module of the first wireless device (910).

Subsequently, a DPP protocol for an Authentication protocol (e.g., S620 of FIG. 6) of the DPP procedure and a Configuration protocol (e.g., S630 of FIG. 6) of the DPP procedure may be started.

Figure 10:
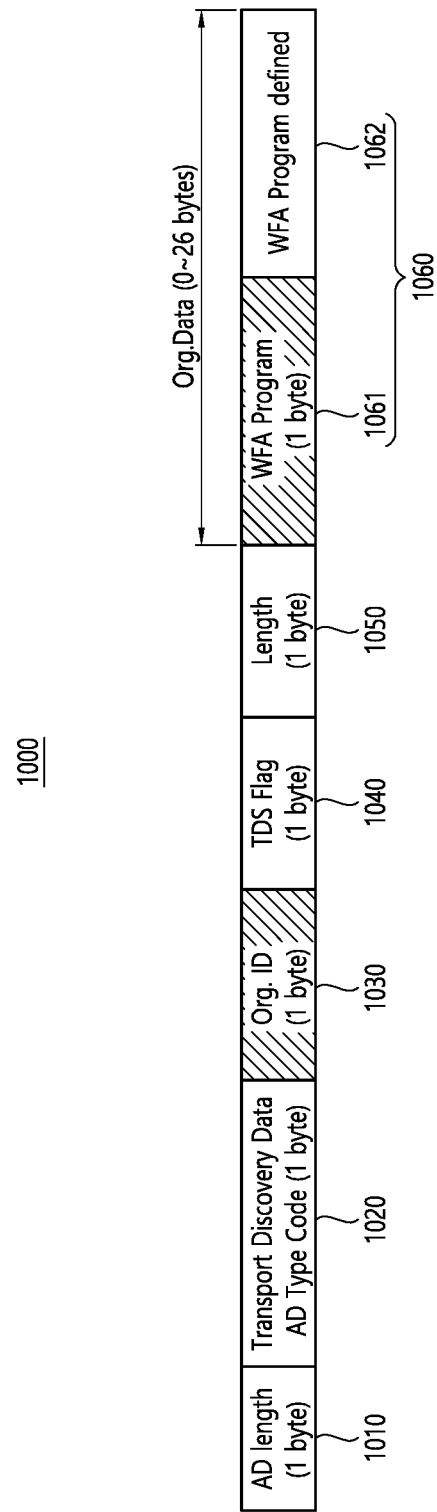
FIG. 10 shows a format of a TDS packet for BLE according an embodiment of the present disclosure.

FIG. 10 shows a format of a TDS packet for BLE according an embodiment of the present disclosure.

According to an embodiment of the present disclosure, a TDS packet (1000) related to a primary channel may include multiple fields (1010~1060).

For example, 1 byte may be allocated for an AD length field (1010). And, 1 byte may be allocated for a Transport Discovery Data AD Type Code field (1020).

For example, 1 byte may be allocated for an Org.ID field (1030). And, the Org.ID field (1030) may be defined as shown below in Table 3.

TABLE 3

| Value | Definition |
| --- | --- |
| 0x00 | RFU |
| 0x01 | Bluetooth SIG |
| 0x02 | WFA |
| 0x03-0xFF | BT SIG assigned number for WFA program usage |

For example, the Org.ID field (1030) according to an embodiment of the present disclosure may include a value ('0x02') for indicating WFA.

For example, 1 byte may be allocated for a TDS Flag field (1040). And, 1 byte may be allocated for a length field (1050).

For example, 0 to 26 bytes may be variably allocated for an Org.Data field (1060).

Herein, when information for indicating WFA ('0x02') is allocated to the Org.ID field (1030), the Org.Data field (1060) may include a WFA program field (1061) and a WFA program definition data field (1062).

For example, 1 byte may be allocated for the WFA program field (1061).

For example, '0x00' may be allocated to the WFA program field (1061) in order to define DPP. And, '0x01' may be allocated to the WFA program field (1061) in order to define NAN.

For example, '0x02' may be allocated to the WFA program field (1061) in order to define ASP.

For example, data according to the value included in the WFA program field (1061) may be included in the WFA program definition data field (1062).

For example, the WFA program definition data field (1062) of the ADV_EXT_IND packet may be defined to include the information shown below in Table 4.

TABLE 4

| Parameter | Value |
| --- | --- |
| Advertisement type | ADV_EXT_IND |
| Mode | Mode Non-Connectable and Non-Scannable Undirected with auxiliary packet |
| ADI | Set to 0 |
| AuxPtr | Contains the Secondary Channel information |
| TxPower | The TxPower as specified in [36] |

Figure 11:
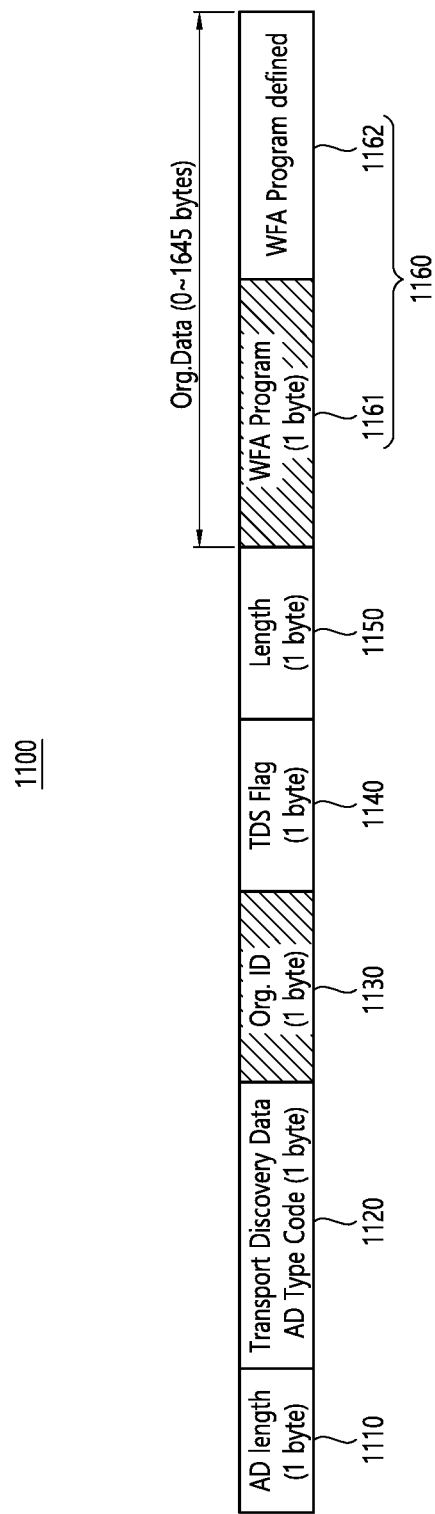
FIG. 11 shows a format of a TDS packet for BLE according another embodiment of the present disclosure.

FIG. 11 shows a format of a TDS packet for BLE according another embodiment of the present disclosure.

According to an embodiment of the present disclosure, a TDS packet (1100) related to a secondary channel may include multiple fields (1110~1160).

For example, 0 to 1645 bytes may be variably allocated for an Org.Data field (1160).

For example, the WFA program definition data field (1162) of the AUX_ADV_IND packet may be defined to include the information shown below in Table 5.

TABLE 5

| Parameter | Value |
| --- | --- |
| Advertisement type | AUX_ADV_IND |
| ADI | Set to 0 |
| TxPower | The TxPower as specified in [36] |
| Payload | TDS Packet |

Figure 12:
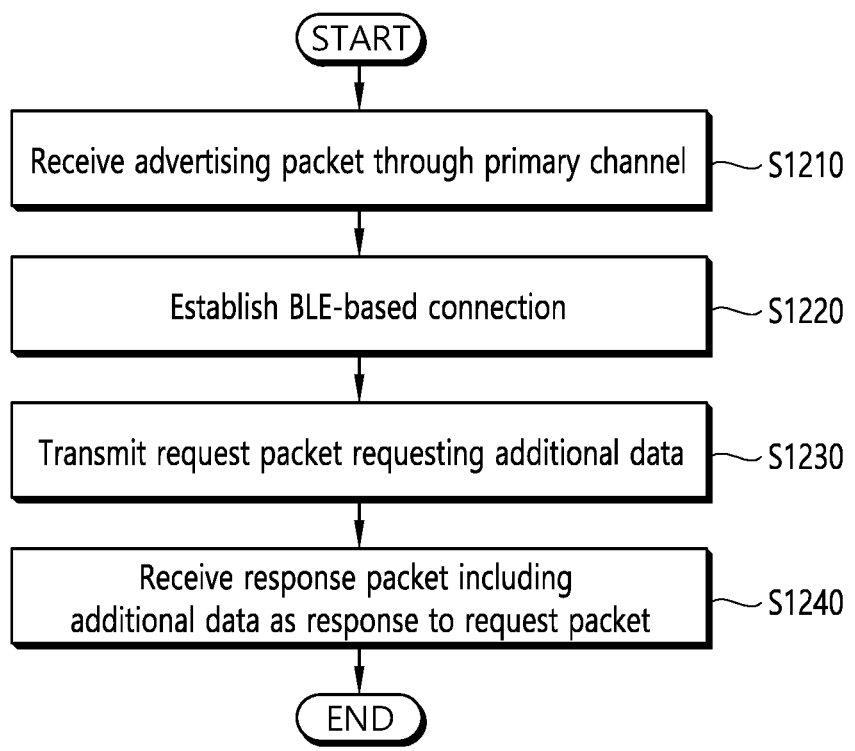
FIG. 12 is a flow chart showing a method for establishing a wireless connection in a wireless LAN system in a viewpoint of a configurator according to an embodiment of the present disclosure.

FIG. 12 is a flow chart showing a method for establishing a wireless connection in a wireless LAN system in a viewpoint of a Configurator according to an embodiment of the present disclosure.

For clarity and simplicity in the description of FIG. 12, it may be assumed that a first wireless device performs the role of a Configurator for a DPP procedure. And, it may be assumed that a second wireless device performs the role of an Enrollee for the DPP procedure.

Referring to FIG. 1 to FIG. 12, in step S1210, a first wireless device may receive an Advertising packet from a second wireless device through a primary channel.

For example, the Advertising packet may be defined as a format of an ADV_IND type Transport Discovery Service (TDS) packet.

For example, the Advertising packet may include first information specifying a Wi-Fi service for the Advertising packet and second information related to the presence of additional data.

Herein, the first information may be set to a first value related to a Device Provisioning Protocol (DPP) procedure or a second value related to a Neighbor Awareness Network (NAN) procedure.

For example, the primary channel may be configured of any one of 3 predetermined channels, among 40 channels each having a 2 MHz bandwidth of a 2.4 GHz band.

Step S1220 may be understood as an assumption that the first information is set to a first value. In step S1220, the first wireless device may establish a BLE-based connection with the second wireless device in order to receive additional data.

For example, after establishing a BLE-based connection, the first wireless device may be related to a GATT client. Additionally, the second wireless device may be related to a GATT server.

In step S1230, the first wireless device may transmit a Request packet requesting additional data to the second wireless device.

For example, the Request packet may include information related to a universally unique identifier (UUID) for additional data.

In step S1240, the first wireless device may receive a Response packet including additional information from the second wireless device as a response to the Request packet.

For example, the additional data may be related to the DPP Bootstrap URI information of the second wireless device.

Although it is not shown in FIG. 12, the first wireless device may acquire DPP Bootstrap URI information of the second wireless device based on the Response packet, which is received based on the BLE module.

Additionally, after the DPP Bootstrap URI information is acquired based on the Wi-Fi module of the first wireless device, in order to start the DPP procedure, the first wireless device may transmit a DPP Approval Request packet to the second wireless device.

Figure 13:
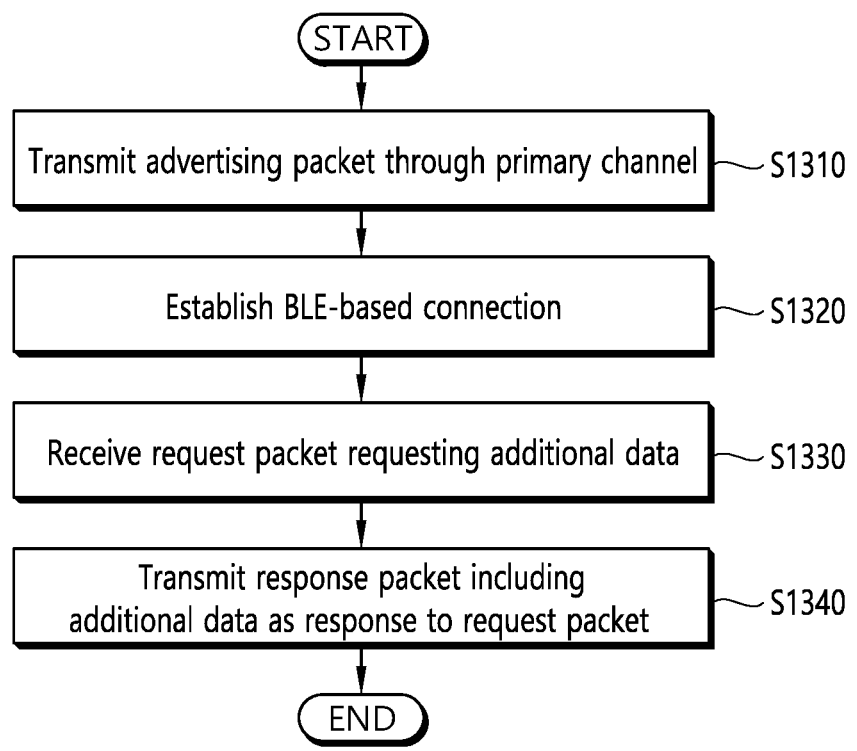
FIG. 13 is a flow chart showing a method for establishing a DPP-based wireless connection in a viewpoint of an enrollee according to an embodiment of the present disclosure.

FIG. 13 is a flow chart showing a method for establishing a DPP-based wireless connection in a viewpoint of an Enrollee according to an embodiment of the present disclosure.

For clarity and simplicity in the description of FIG. 13, it may be assumed that a first wireless device performs the role of a Configurator for a DPP procedure. And, it may be assumed that a second wireless device performs the role of an Enrollee for the DPP procedure.

Referring to FIG. 12 and FIG. 13, in step S1310, a second wireless device may transmit an Advertising packet to a second wireless device through a primary channel.

For example, the Advertising packet may be defined as a format of an ADV_IND type Transport Discovery Service (TDS) packet.

For example, the Advertising packet may include first information specifying a Wi-Fi service for the Advertising packet and second information related to the presence of additional data.

Herein, the first information may be set to a first value related to a Device Provisioning Protocol (DPP) procedure or a second value related to a Neighbor Awareness Network (NAN) procedure.

For example, the primary channel may be configured of any one of 3 predetermined channels, among 40 channels each having a 2 MHz bandwidth of a 2.4 GHz band.

Step S1320 may be understood as an assumption that the first information is set to a first value. In step S1320, the second wireless device may establish a BLE-based connection with the first wireless device in order to transmit additional data.

For example, after establishing a BLE-based connection, the first wireless device may be associated with a GATT client. Additionally, the second wireless device may be associated with a GATT server.

In step S1330, the second wireless device may receive a Request packet requesting additional data from the first wireless device.

For example, the Request packet may include information related to a universally unique identifier (UUID) for additional data.

In step S1340, the second wireless device may transmit a Response packet including additional information to the first wireless device as a response to the Request packet.

For example, the additional data may be related to the DPP Bootstrap URI information of the second wireless device.

Although it is not shown in FIG. 13, the second wireless device may receive a DPP Approval Request packet from the first wireless device.

Figure 14:
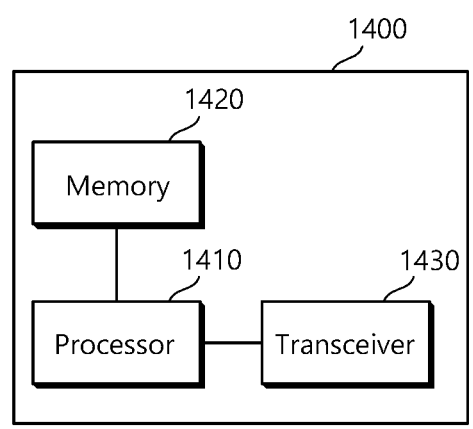
FIG. 14 is a block diagram showing a wireless device to which the embodiment of the present disclosure can be applied.

FIG. 14 is a block diagram showing a wireless device to which the embodiment of the present disclosure can be applied.

Referring to FIG. 14, as an STA that can implement the above-described exemplary embodiment, the wireless device may operate as an AP or a non-AP STA. The wireless device may correspond to the above-described user or may correspond to a transmitting device transmitting a signal to the user.

As shown in the drawing, the wireless device of FIG. 14, as shown, includes a processor (1410), a memory (1420), and a transceiver (1430). As shown in the drawing, the processor (1410), memory (1420), and transceiver (1430) may each be implemented as a separate chip, or at least two or more blocks/functions may be implemented through a single chip.

The transceiver (1430) is a device including a transmitter and a receiver. Herein, if a specific operation is performed, operations of only one of the transmitter and the receiver may be performed, or operations of both the transmitter and the receiver may be performed.

The transceiver (1430) may include one or more antennas for transmitting and/or receiving a radio signal. Furthermore, the transceiver (1430) may include an amplifier for amplifying a reception signal and/or a transmission signal, and a bandpass filter for performing transmission on a specific frequency band.

The processor (1410) may implement the functions, processes and/or methods proposed in this specification. For example, the processor (1410) may perform the above-described operations according to the embodiment of the present disclosure. That is, processor (1410) may perform the operations disclosed in the embodiments of FIG. 1 to FIG. 13.

The processor (1410) may include application-specific integrated circuits (ASIC), other chipsets, logic circuits, data processors and/or a converter for converting a baseband signal into a radio signal, and vice versa.

The memory (1420) may include a read-only memory (ROM), a random access memory (RAM), a flash memory, a memory card, a storage medium and/or other storage devices.

FIG. 15 is a block diagram showing an example of a device being included in a processor.

For convenience in the description, the example of FIG. 15 has been described based on blocks for a transmission signal, but it is apparent that a reception signal may also be processed by using the corresponding blocks.

As shown in the drawing, a data processor (1510) generates transmission data (control data and/or user data) corresponding to a transmission signal. An output of the data processor (1510) may be input to an encoder (1520). The encoder (1520) may perform coding through a binary convolutional code (BCC) or a low-density parity-check (LDPC) scheme. At least one encoder (1520) may be included, and the number of encoders (1520) may be determined depending on various types of information (e.g., the number of data streams).

An output of the encoder (1520) may be input to an interleaver (1530). The interleaver (1530) performs an operation of distributing consecutive bit signals on a radio resource (e.g., time and/or frequency) in order to prevent a burst error, which is caused by fading. At least one interleaver (1530) may be included, and the number of interleavers (1530) may be determined depending on various types of information (e.g., the number of spatial streams).

An output of the interleaver (1530) may be input to a constellation mapper (1540). The constellation mapper (1540) performs constellation mapping, such as biphase shift keying (BPSK), quadrature phase shift keying (QPSK), quadrature amplitude modulation (n-QAM), and so on.

An output of the constellation mapper (1540) may be input to a spatial stream encoder (1550). The spatial stream encoder (1550) performs data processing in order to transmit a transmission signal through at least one spatial stream. For example, the spatial stream encoder (1550) may perform at least one of space-time block coding (STBC), cyclic shift diversity (CSD) insertion, and spatial mapping on a transmission signal.

An output of the spatial stream encoder (1550) may be input to an IDFT block (1560). The IDFT block (1560) performs inverse discrete Fourier transform (IDFT) or inverse Fast Fourier transform (IFFT).

An output of the IDFT block (1560) is input to a guard interval (GI) inserter (1570), and an output of the GI inserter (1570) is input to the transceiver (1430) of FIG. 14.

Although a detailed description of this specification has been described in relation with a detailed embodiment of the present disclosure, various modifications and/or variations may be made without departing from the scope of the present specification. Therefore, the scope of the present specification shall not be construed as being limited only to the above-described embodiment, but shall be defined by the scope and spirit of the claims of the present disclosure as well as their equivalents.

What is claimed is:

1. A method for establishing a wireless connection in a wireless Local Area Network (LAN) system, the method comprising:
    receiving, by a first wireless device, an advertising packet from a second wireless device,
    wherein the advertising packet is configured based on a Transport Discovery Service (TDS) packet, and
    wherein the TDS packet includes an Organization identifier (ID) field and an Organization Data field, the Organization ID field includes information on an organization related to the TDS packet, a pre-defined value of the Organization ID field is used for identifying Wi-Fi Alliance (WFA), the Organization Data field includes a header field and a service information field, a pre-defined value of the header field is used for identifying that the service information field is used for a Device Provisioning Protocol (DPP);
    after receiving the advertising packet, establishing, by the first wireless device, a Bluetooth Low Energy (BLE) based connection with the second wireless device for the DPP;
    transmitting, by the first wireless device, a request packet requesting additional data related to the DPP to the second wireless device; and
    receiving, by the first wireless device, a response packet including the additional data from the second wireless device as a response to the request packet,
    wherein the additional data is related to DPP Bootstrap Uniform Resource Identifier (URI) information of the second wireless device.

2. The method of claim 1, further comprising:
    acquiring, by the first wireless device, the DPP Bootstrap URI information of the second wireless device based on the received response packet; and
    after acquiring the DPP Bootstrap URI information, transmitting, by the first wireless device, a DPP approval request packet to the second wireless device.

3. The method of claim 1, wherein the request packet includes information related to a universally unique identifier (UUID) for the additional data.

4. The method of claim 1, wherein, after establishing the BLE based connection, the first wireless device is related to a Generic Attribute Profile (GATT) client and the second wireless device is related to a GATT server, and
    wherein the advertising packet is defined as a format of an ADV_IND type Transport Discovery Service (TDS) packet.

5. The method of claim 1, wherein the TDS packet further includes a control field related to whether the TDS packet includes incomplete data.

6. A first wireless device performing a method for establishing a wireless connection in a wireless Local Area Network (LAN) system, the first wireless device comprising:
    a transceiver transmitting and/or receiving a radio signal; and
    a processor being connected to the transceiver, the processor being configured to:
    receive an advertising packet from a second wireless device,
    wherein the advertising packet is configured based on a Transport Discovery Service (TDS) packet, and
    wherein the TDS packet includes an Organization identifier (ID) field and an Organization Data field, the Organization ID field includes information on an organization related to the TDS packet, a pre-defined value of the Organization ID field is used for identifying Wi-Fi Alliance (WFA), the Organization Data field includes a header field and a service information field, a pre-defined value of the header field is used for identifying that the service information field is used for a Device Provisioning Protocol (DPP),
    after receiving the advertising packet, establish a Bluetooth Low Energy (BLE) based connection with the second wireless device for the DPP,
    transmit a request packet requesting additional data related to the DPP to the second wireless device, and
    receive a response packet including the additional data from the second wireless device as a response to the request packet,
    wherein the additional data is related to DPP Bootstrap Uniform Resource Identifier (URI) information of the second wireless device.

7. The first wireless device of claim 6, wherein the processor is further configured to:
    acquire the DPP Bootstrap URI information of the second wireless device based on the received response packet, and
    after acquiring the DPP Bootstrap URI information, transmit a DPP approval request packet to the second wireless device.

8. The first wireless device of claim 6, wherein the request packet includes information related to a universally unique identifier (UUID) for the additional data.

9. The first wireless device of claim 6, wherein, after establishing the BLE based connection, the first wireless device is related to a Generic Attribute Profile (GATT) client and the second wireless device is related to a GATT server, and
    wherein the advertising packet is defined as a format of an ADV_IND type Transport Discovery Service (TDS) packet.

10. The first wireless device of claim 6, wherein the TDS packet further includes a control field related to whether the TDS packet includes incomplete data.

* * * * *